June 6, 1961

L. J. DE LANTY 2,986,942

GYRO VERTICALS

Filed July 12, 1956

INVENTOR
LOREN J. DE LANTY
BY
Herbert H. Thompson
his ATTORNEY.

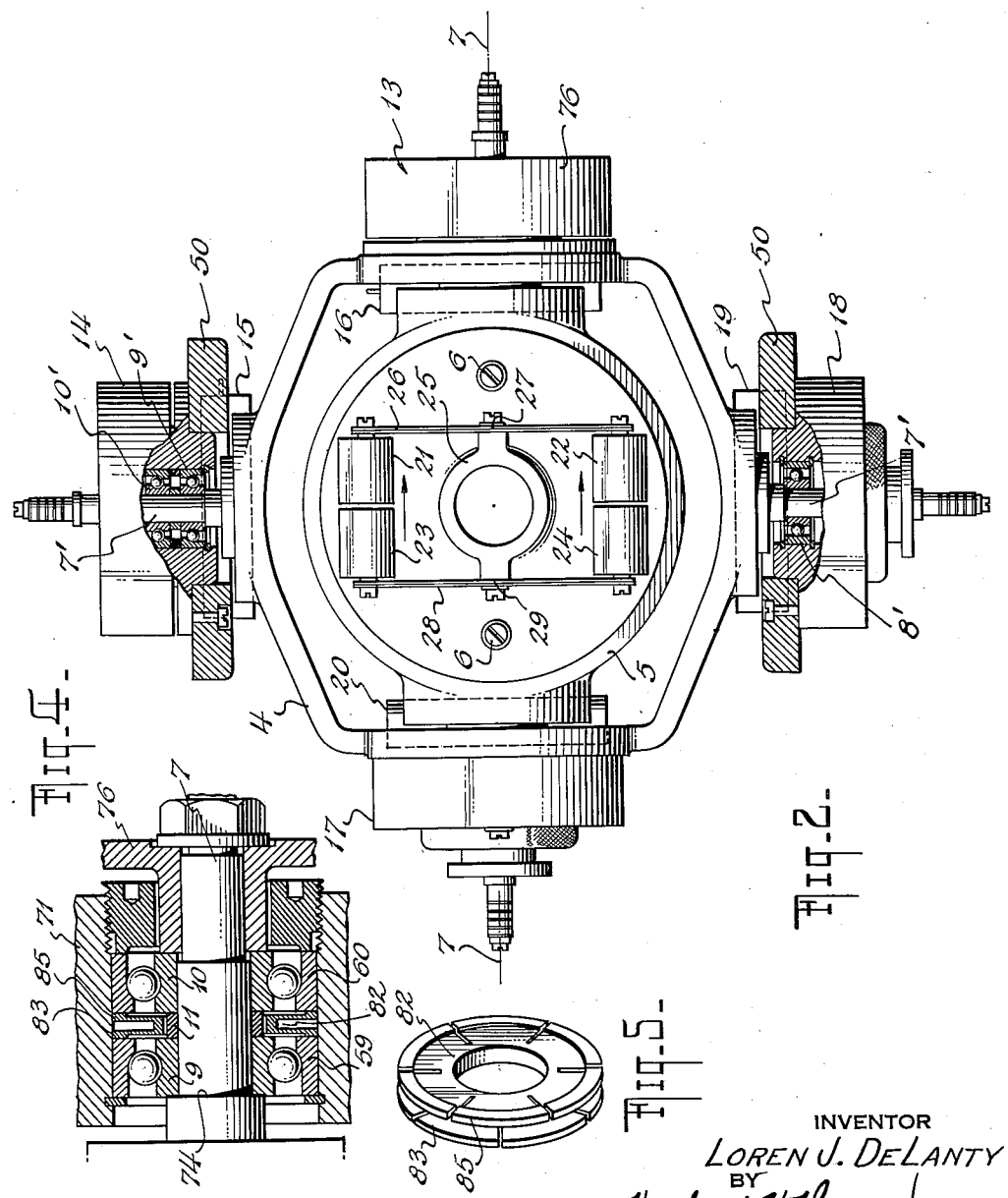

United States Patent Office 2,986,942
Patented June 6, 1961

2,986,942
GYRO VERTICALS
Loren J. De Lanty, Baldwin, N.Y., assignor to Sperry Rand Corporation, a corporation of Delaware
Filed July 12, 1956, Ser. No. 597,398
7 Claims. (Cl. 74—5.4)

This invention relates to accurate gyro verticals, and more particularly, to means for preventing errors therein due to shifts in the center of gravity caused by unequal expansion of the parts during temperature rise. To this end, my invention employs an improved gimbal bearing system in which the gyroscope is fixed or anchored at one trunnion of its minor axis against axial movement along said axis so that a shift in the center of gravity due to temperature rise takes place in one direction only from the center of support of the system. My improved anchor bearing enables me to compensate for the axial shift that takes place during temperature rise by employing a counterweight which is shifted in the opposite direction along said axis during temperature rise as by means of a thermostatic strip. Preferably, a plurality of counterweights are employed for this purpose so that the balance about the vertical axis remains undisturbed by the mass transfer other than that due to the bimetal transfer. By my improved bearing mount, I also shock mount the gyro and its gimbal bearings and prevent fretting of the ball bearings by grounding static discharge across the bearings.

A further improvement I have effected is designing the system so that the gyro element proper, that is, the rotor bearing case, may be readily removed from its gimbal for examination or repair without disturbing the gimbal bearings about either axis.

Referring to the drawings in which a preferred form of the invention is shown,

FIG. 2 is a bottom plan view of the same, partly in section and on a smaller scale;

FIG. 4 is a corresponding section of still another form of such bearing; and

FIG. 5 is a perspective view of another form of the spacing washer employed in FIG. 4.

Figures 1, 3:
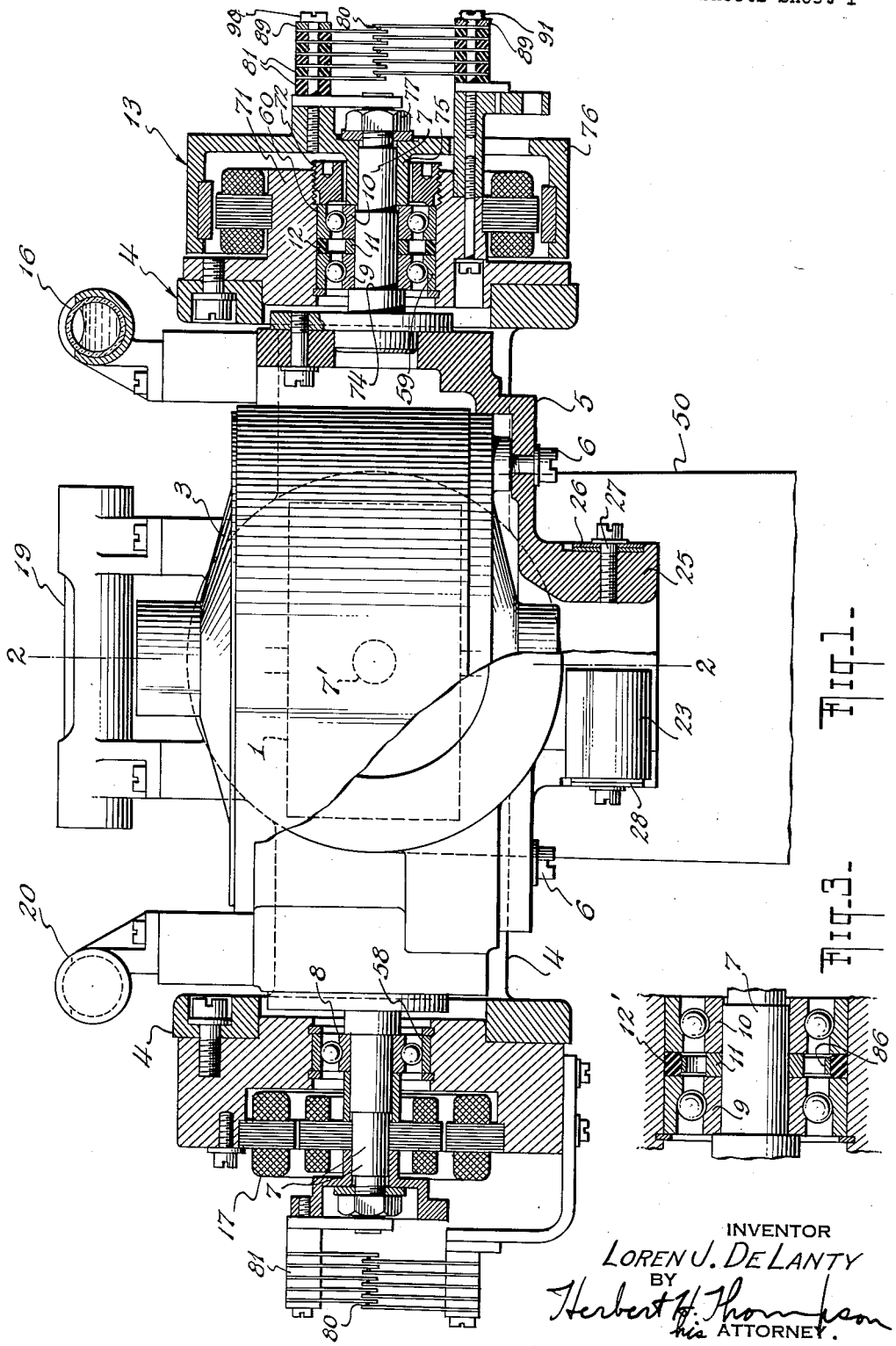
FIG. 1 is a vertical section, partly in elevation, through a gyro vertical constructed in accordance with my invention.
FIG. 3 is a detailed sectional view of a modified form of bearing preventing axial movement of the gimbal at one trunnion.

The gyro unit proper may consist of a rotor 1 mounted for spinning about a vertical axis 2—2 within a rotor case 3 in a conventional manner. Instead of providing bearings directly between the rotor case and gimbal ring 4, I preferably mount or cradle the rotor case in a cup-shaped inner gimbal 5 which is made to receive the rotor case and within which the rotor case may be secured and adjusted by mounting screws 6—6. The cradle 5 is shown as journaled on a minor axis within the outer gimbal ring 4 by means of trunnions 7′—7 extending therefrom, and gimbal 4 is journaled about its major or roll axis on trunnions 7′—7′ within fixed support or brackets 50. On one side of the minor axis the antifriction bearing 8 between the trunnion 7 and the gimbal ring 4 is of such construction that it rotatably mounts the trunnion within the gimbal but leaves it unrestricted as to end play so that relative axial movement of the rotor case and cup 5 with respect to the gimbal is unrestricted at that side of the gyroscope. To this end, at least one of the races of ball bearing 8, preferably the outer race 58, is cylindrical, i.e., has no annular channel therein so that axial end play is unrestricted.

The opposite antifriction bearing, however, is shown as comprising two axially spaced ball bearings 9, 10 of the end thrust type. The outer race 59 of bearing 9 fixed within boss 71 of gimbal ring 4 is shown as of decreased internal diameter adjacent bearing 10 so that it acts not only to freely rotatably mount the trunnion but as a thrust bearing to oppose end play to the right in FIG. 1. Bearing 10, on the other hand, has its outer race 60 of smaller diameter adjacent bearing 9 so that it acts as a thrust bearing to oppose end play in the opposite direction. Therefore, the trunnion is anchored to the gimbal at one end only at two closely spaced points which remain substantially fixed with respect to each other throughout temperature changes.

The inner races of the bearings 9 and 10 are shown as spaced by an inner metallic ring 11 and they are clamped in place between shoulder 74 on trunnion 7 and the hub 75 of the rotor 76 of torque motor 13 which in turn is held in place by nut 77 on the end of trunnion 7. The outer races of said bearings are shown spaced by an outer ring 12 of resilient material such as neoprene or split metal ring which not only permits a slight amount of play between the two bearing races but also acts to absorb shocks which would otherwise reach the sensitive element. The two outer races are clamped in place by nut 72 threaded into boss 71 which supports the stator of torquer 13 and is bolted to ring 4. By this construction the bearing acts as a shock absorber to prevent severe shocks in an axial direction from reaching the sensitive instrument. It will readily be seen also that upon temperature rise the center of gravity of the gyroscope will be shifted to only the left in FIG. 1 from the point of anchorage provided by the bearings 9, 10.

The gyroscope is shown as equipped with the usual erection system comprising torquers 13 and 14 operating about the minor and major axes respectively and controlled by gravitationally responsive devices such as liquid level devices 15 and 16 operating about the major and minor axes respectively. Electrical transmitters 17 and 18 of the selsyn type are also shown about said axes to transmit the vertical to remote instruments on the ship.

Preferably also an additional level is provided about each axis to aid in manually presetting the gyroscope. Such levels are shown at 19 and 20 as placed oppositely to the other pair so that perfect balance of the gyroscope is not appreciably disturbed when tilted. The levels are shown as positioned on the cup 5 and gimbal 4.

To correct for the thermal shift in center of gravity above described, I have shown a system of compensating masses 21, 22, 23 and 24. These are shown as mounted underneath the cup 5 on a downward extension 25 thereof which may be used for caging. These masses are mounted on opposite sides of the vertical axis for movement in an axial direction along axis 7′—7. For this purpose the masses 21 and 22 are secured to opposite ends of a thermostatic strip 26 bolted at its middle 27 to said extension 25. Similarly the masses 23, 24 are secured to the opposite ends of thermostatic strip 28 secured at its middle 29 to the opposite side of said downward extension 25. The thermostatic strips are preferably oppositely bowed with respect to their centers 27 and 29, that is, upon increase in temperature one becomes convex and the other concave with respect to extension 25 so that they both move the masses 21, 22 and 23, 24 in the same lateral direction toward the anchor bearing 9, 10 to compensate for the opposite movement of the center of gravity upon increase in temperature. Hence no shift in the over-all center of gravity along the minor axis takes place.

It should be noted that the thermostatic strips are intimately secured at their centers to the caging structure 25 which is an intimate part of the mounting cup 5. The temperature of this extension and the strips, therefore, will quickly follow the quick rise in temperature that takes place during starting up operations when full starting current is supplied to the gyro rotor. The strips will also assume the ambient temperature of the entire assembly during normal operation so that perfect balance is maintained along the pitch axis, both during normal operation and during quick starting operations.

Similar anchor bearings 9', 10' may be provided at the forward end of trunnion 7' of the gimbal ring 4 and a similar axially-free bearing 8' may be provided for the opposite side of said gimbal ring. In this case, however, axial shift of the center of gravity along the trunnion 7'—7' does not disturb the balance of the gyroscope about the minor axis of trunnions 7—7 because the entire gyroscope, including the trunnions and their bearings, moves together, so that there is no disturbance of the balance of the gyroscope about axis 7—7 due to temperature changes. Therefore, I have not shown any compensating weights about the minor axis 7—7, but I have retained the anchor bearings 9', 10' and the axially-free bearing 8' about this axis for uniformity and because of the shock-absorbing properties for these bearings.

To prevent fretting of the ball bearings due to static discharges across the same, I prefer to ground the rotatable or supported parts to the fixed support of the instrument so that all parts of the ball bearings are at the same potential and static charges will not accumulate. This may be readily accomplished by incorporating an extra contact 80 on the grouped contactors 81 which lead current into the gyroscope spin rotor and torquers and transmitters. This contact 80 electrically connects trunnion 7 or 7' of each bearing including the hub of rotor 76 and the inner races 9 and 10 to the fixed mounting 4, 71 including the outer races 59, 60. For this purpose, metal washers 89 are placed between mounting screws 90 and 91 and the fingers 80, while insulating washers insulate all other fingers from the framework.

In FIG. 3 is shown a modified form of spacer for the outer races of the ball bearings. In this form I have shown a metallic ring 86 within the outer spacer 12' and of less axial thickness, ring 86 tending to prevent the resilient spacer from being squeezed inwardly by the pressure of the outer races so as to increase the resilient force resisting movement of the outer races toward one another.

In FIGS. 4 and 5 I show still another form of spacer. It comprises a grooved annulus or ring 83 which surrounds the fixed spacer 11. Said ring is of less axial thickness at its center than the spacer 11 and towards its outer periphery it is deeply grooved or channeled to form axial spaced outer discs which are thickened at the outer edges 85 and bear against the inner spaced outer races at each side. Preferably the discs are also radially split for a portion of their diameters so as to increase their spring constant. It is evident, therefore, that this composite arrangement will exert pressure between the outer races at a plurality of spaced points and uniformly distribute the pressure.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. A gimbal supported sensitive instrument, a pair of spaced bearings pivotally mounting said instrument in a support for freedom about a normally horizontal axis, one of said bearings being of the combined rotary and thrust type thereby preventing relative axial movement of the instrument in its support and the other of said bearings permitting axial as well as rotary movement, whereby upon temperature rise the center of gravity of said instrument shifts away from said thrust bearing, a mass mounted on said instrument for movement in a direction parallel to said axis, and thermostatic means for moving said mass toward said thrust bearing upon temperature rise to compensate for thermal shift of the center of gravity of the instrument away from said bearing.

2. A gimbal supported sensitive instrument as claimed in claim 1, in which said combined rotary and thrust type bearing comprises a pair of slightly spaced rotary ball bearings, each having one race secured to said instrument and the other to said support, one bearing being arranged to absorb thrust or axial movement in one direction and the other arranged to absorb thrust or axial movement in the opposite direction.

3. A gimbal supported sensitive instrument, a pair of spaced bearings pivotally mounting said instrument in a support for freedom about a normally horizontal axis, one of said bearings being of the thrust type and preventing relative axial movement of the instrument and its support and the other of said bearings permitting axial as well as rotary movement whereby upon temperature rise the center of gravity of said instrument shifts away from said thrust bearing, a plurality of masses symmetrically positioned about the vertical axis of said instrument, a thermostatic strip secured at its center to said instrument and supporting one pair of masses adjacent its opposite ends to one side of said vertical axis, and a second thermostatic strip secured at its center to said instrument and supporting the other pair of masses at its opposite ends and on the opposite side of said vertical axis, whereby all said masses are moved toward said thrust bearing through like distances upon temperature rise.

4. A gimbal supported gyro vertical comprising a gimbal ring, means supporting said gimbal with freedom about a major axis, a cup-like ring supported by said gimbal with freedom about a minor axis, a gyro rotor casing adapted to detachably fit in said cup-like ring, a torquer between said supporting means and gimbal, a torquer between said gimbal and cup-like ring, thermal compensating masses on said ring and liquid levels on said ring and gimbal for controlling said torquers, and additional levels on said ring and gimbal placed in complementary relation to said other levels for assisting in initially levelling the gyro rotor casing.

5. In a gimbal supported sensitive instrument, a pair of spaced bearings pivotally mounting said instrument in a support for freedom about a normally horizontal axis, one of said bearings comprising a pair of closely spaced ball bearings of the combined rotary and thrust type, one of which permits axial movement in one direction only and the other in the opposite direction only, and a resilient spacer between at least one part of each of said bearings adapted to absorb shocks, the other of said bearings comprising a ball bearing permitting free axial as well as rotary motion.

6. A gimbal supported sensitive instrument as claimed in claim 5, having a substantially rigid spacer between the inner races of said first bearing and a resilient spacer between the outer races of said bearing, means for clamping the inner races against said rigid spacer, and means for clamping said outer races against said resilient spacer.

7. A gimbal supported sensitive instrument as claimed in claim 1, wherein said thermostatic means is mounted in intimate contact with the instrument so that rapid temperature rise during the starting up period is transmitted quickly to said thermostatic means.

References Cited in the file of this patent

UNITED STATES PATENTS

| | | |
|---|---|---|
| 1,399,959 | Hanson | Dec. 13, 1921 |
| 1,729,734 | Carter | Oct. 1, 1929 |
| 2,253,119 | Goerth | Aug. 19, 1941 |
| 2,367,667 | Carter | Jan. 23, 1945 |

FOREIGN PATENTS

| | | |
|---|---|---|
| 623,943 | Great Britain | May 25, 1949 |